2,753,344
Patented July 3, 1956

2,753,344
CHROME CONTAINING AZOMETHINE DYESTUFFS

Karl Schmidt, Leverkusen-Bayerwerk, Werner Müller, Koln, Rolf Pütter, Dusseldorf, Fritz Suckfüll and Gerhard Dittmar, Leverkusen, Germany, assignors to Farbenfabriken Bayer Aktiengesellschaft, Leverkusen, Germany, a corporation of Germany No Drawing. Application March 30, 1954,
Serial No. 419,908
Claims priority, application Germany April 4, 1953
8 Claims. (Cl. 260—240)

The present invention relates to new chrome containing azomethine dyestuffs and to a process of making the same; more particularly it relates to the chrome complex compounds of o,o'-dihydroxyazomethine dyestuffs free from sulfonic or carboxylic acid groups corresponding to the following general formula

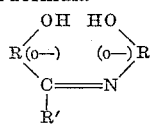

wherein the radicals R are aromatic radicals of which at least one contains an alkylsulfone group and R' stands for hydrogen or an organic radical. The alkylsulfone groups attached to one or both radicals R may be linked thereto either as open chain radical or as ring.

In French Patent 811,814 and its patents of addition 49,406 and 49,497 there is described a manufacture of metal containing o,o'-dihydroxyazomethine dyestuffs which are distinguished by good fastness properties. The chrome containing dyestuffs with a sulfonic acid group in the molecule dye wool from strongly sulfuric acid dyebath; the dyeings are likewise distinguished by good fastness properties. The shades of the chrome containing dyestuffs obtained according to the processes of the mentioned patents are limited substantially to yellow. If in dyeing these dyestuffs weakly acid dye-baths are employed no full and fast dyeings are obtained.

We have now found that new valuable chromium complex compounds of o,o'-dihydroxyazomethine dyestuffs can be obtained, if in their preparation components are used which contain alkylsulfone groups either as open chain radicals or as ring. Typical representatives of these alkylsulfone groups are —SO₂.CH₃ (open chain) and —SO₂.CH₂.O— (ring). The sulfone ether starting materials may be obtained as disclosed in copending application S. N. 366,616 of common assignment, filed July 7, 1953.

These new dyestuffs can be made by condensing o-hydroxycarbonyl compounds of the general formula

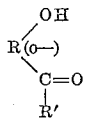

wherein R is an aromatic radical, R' stands for hydrogen or an organic radical, with aromatic o-hydroxyamino compounds in the presence of chromium yielding agents in water or organic solvents or solvent mixtures, one of the two components or both containing in the aromatic radical alkylsulfone groups either as open chain radical or as ring. The aromatic radicals may contain further substituents except sulfonic or carboxylic acid groups.

Suitable o-hydroxycarbonyl compounds for the above process are e. g. 5-chloro-2-hydroxy-benzaldehyde, 5-bromo-2-hydroxybenzaldehyde, 3,5-dichloro-2-hydroxybenzaldehyde, 3-nitro-5-chloro-2-hydroxybenzaldehyde, 2-hydroxy-1-naphthaldehyde, 6-bromo-2-hydroxy-1-naphthaldehyde, the aldehyde of hydroquinone methylene sulfone ether of the formula

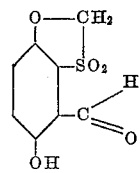

[5-hydroxybenzoxathiol-S-dioxide-4-aldehyde], the naphthohydroquinone methylene sulfone ether aldehyde of the formula

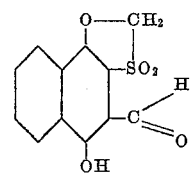

[4'-hydroxynaphtho-(2',1':4,5)-oxathiol-S-dioxide-3'-aldehyde].

Suitable aromatic o-hydroxyamino compounds are e. g. 2-amino-1-hydroxybenzene, 2-amino-1-hydroxybenzene-4-sulfonamide, 4-nitro-6-chloro-2-amino-1-hydroxybenzene, 4,6-dinitro-2-amino-1-hydroxybenzene, 3,4,6-trichloro-2-amino-1-hydroxybenzene, 2-amino-1-hydroxybenzene-4-methylsulfone, aminohydroquinone methylene sulfone ether of the formula

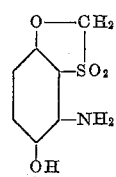

[4-amino-5-hydroxybenzoxathiol-S-dioxide].

The new chrome containing dyestuffs are distinguished over the hitherto known comparable dyestuffs particularly by the fact that they possess a water-solubility sufficient for the dyeing-process in spite of the absence of acid water-solubilizing groups and that they yield full and fast shades on animal fibres from neutral to weakly acid dye-baths. A further valuable and surprising property of the new dyestuffs are the shades they yield which show compared with the hitherto known chrome containing azomethine dyestuffs, an unexpected and strong deepening; according to the components used in the manufacture of the dyestuffs the shades are shifted to the blue side of the spectrum far beyond red.

The following examples illustrate the present invention without, however, limiting it thereto; the parts being by weight:

Example 1

7.83 parts of 5-chloro-2-hydroxybenzaldehyde and 10.05 parts of aminohydroquinone methylene sulfone ether are heated in 150 parts of formamide for half an hour to a temperature of about 95° C. At this temperature a solution of 4.26 parts of potassium bichromate (K₂Cr₂O₇) and 7.83 parts of glucose in 100 parts of water is dropped in within one hour, and the solution is heated for further 1½ hours to about 95° C. After cooling, the separated deposit is sucked off, washed with 250 parts of cold water and dried. The new chromium complex of the dyestuff of the formula

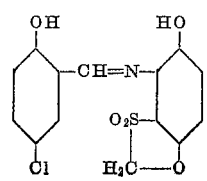

dyes wool from a neutral and weakly acetic bath reddish orange shades. The dyeing is fast to washing and to light. The dyestuff shows a good levelling power.

*Example 2*

10.05 parts of 5-bromo-2-hydroxybenzaldehyde and 10.05 parts of aminohydroquinone methylene sulfone ether are heated in 150 parts of formamide for half an hour to about 95° C. Thereafter 63.2 parts of an aqueous solution of sodium-potassium chrome-salicylate corresponding to 1.56 parts of chromium are run in. The solution obtained is heated on the boiling water bath for 3 hours, and after cooling the reaction mixture the separated chromium complex is sucked off. After drying, 11.84 parts of a brown dyestuff powder being the chrome complex compound of

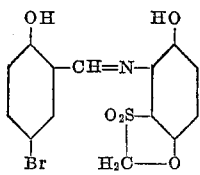

are obtained. The dyestuff dyes wool from a neutral and weakly acetic bath clear reddish orange shades. The dyeing is fast to rubbing and to washing. The levelling power is good.

*Example 3*

By replacing the quantity of the 5-bromo-2-hydroxybenzaldehyde mentioned in Example 2 by 9.54 parts of 3,5-dichloro-2-hydroxybenzaldehyde and further carrying out the process as described therein, 9.2 parts of a brown dyestuff powder being the chrome complex of

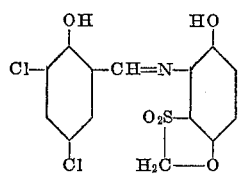

are obtained. When dyed on wool from a neutral or weakly acetic bath, the chromium complex yields a strongly reddish orange dyeing (distinctly redder than that with the dyestuff of Example 2) showing good fastness to washing and to light.

*Example 4*

By replacing the quantity of the 5-bromo-2-hydroxybenzaldehyde mentioned in Example 2 by 10.04 parts of 3-nitro-5-chloro-2-hydroxybenzaldehyde and further carrying out the process as described therein, the chromium complex of the azomethine dyestuff of the formula

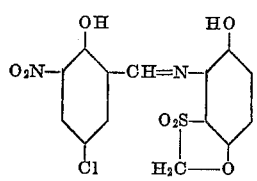

is obtained which dyes wool from a neutral or weakly acetic bath brownish red.

*Example 5*

8.6 parts of 2-hydroxy-1-naphthaldehyde and 10.05 parts of aminohydroquinone methylene sulfone ether are heated in 150 parts of formamide for half an hour to about 95° C. 63.2 parts of an aqueous solution of sodium-potassium chrome-salicylate corresponding to 1.56 parts of chromium are then run in. The solution obtained is heated on the boiling water bath for 3 hours; after cooling the reaction mixture it is introduced into 500 cc. of cold water. The precipitated deposit is sucked off and dried in vacuo at about 60° C. 16.0 parts of a brown dyestuff powder are obtained. This chromium complex of

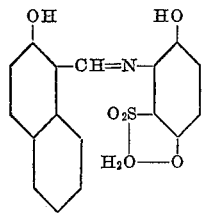

dyes wool from a neutral or weakly acetic bath a slightly bluish red. The dyeing shows a good fastness to rubbing, washing and to light. When employing the 6-bromo-2-hydroxy-1-naphthaldehyde a dyestuff of similar properties is obtained.

*Example 6*

10.70 parts of hydroquinone methylene sulfone ether aldehyde and 9.43 parts of 4-nitro-6-chloro-2-aminophenol are heated in 100 parts of formamide for half an hour to about 95° C. 63.2 parts of an aqueous solution of sodium potassium chrome-salicylate corresponding to 1.56 parts of chromium are then run in, and the solution is heated on the boiling water bath for 3 hours. The chromium complex compound of the azomethine dyestuff of the formula

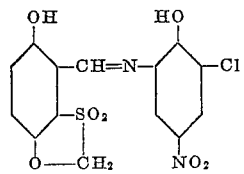

separates in red-brown, fine crystals of metallic lustre which are sucked off at 60° C. and washed with 300 cc. of cold water. After drying 16.5 parts of dyestuff are obtained. The dyestuff dyes wool from a neutral and weakly acetic bath very clear reddish orange shades. The dyeing is fast to rubbing and washing; the levelling power is good.

The hydroquinone methylene sulfone aldehyde

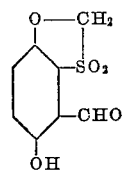

is obtained according to the Reimer-Tiemann synthesis by the action of chloroform upon hydroquinone methylene sulfone ether in caustic soda alkaline solution. The aldehyde thus obtained is soluble in alkalies, insoluble in water. Melting-point 240° C.

*Example 7*

By replacing the quantity of the 4-nitro-6-chloro-2-aminophenol mentioned in Example 6 by 9.95 parts of 4,6-dinitro-2-aminophenol and further carrying out the process as described therein, the brown chromium complex of the azomethine dyestuff of the formula

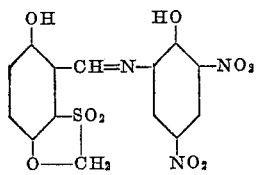

is obtained in the form of fine crystals which dyes wool from a neutral and weakly acetic bath clear, full yellowish red shades.

*Example 8*

By replacing the quantity of the 4-nitro-6-chloro-2- aminophenol mentioned in Example 6 by 9.35 parts of 2-aminophenol-4-methylsulfone and carrying out the process as described therein, 12.3 parts of an orange red crystal powder are obtained which dyes wool from a weakly acetic bath very pure clear orange shades. The new dyestuff is the chrome complex of the compound of the formula

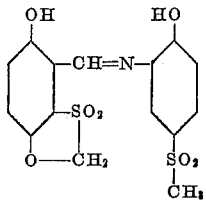

Example 9

10.70 parts of hydroquinone methylene sulfone ether aldehyde and 10.05 parts of aminohydroquinone methylene sulfone ether are heated in 750 parts of water to about 95° C. In this reaction mixture are run 63.2 parts of a solution of sodium-potassium chrome-salicylate corresponding to 1.56 parts of chromium; this mixture is heated on the boiling water bath for 3 hours. After cooling, the dyestuff is sucked off in the form of fine crystals and dried at about 80° C. 21 parts of the chromium complex of the dyestuff of the formula

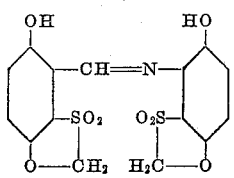

are obtained which dyes wool from a weakly acetic bath clear bordeaux shades.

Example 10

14.20 parts of naphthohydroquinone methylene sulfone ether aldehyde and 11.67 parts of 2-amino-1-hydroxy-benzene-4-methylsulfone chlorohydrate are heated in 240 parts of formamide and 45 parts of water for half an hour to about 95° C. 63.2 parts of an aqueous solution of sodium-potassium chrome-salicylate corresponding to 1.56 parts of chromium are then run in and the reaction mixture is heated on the boiling water bath for 3 hours. After cooling the separated chromium complex of the dyestuff of the formula

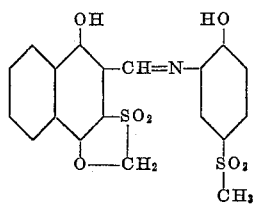

is sucked off and washed with 500 parts of cold water. After dyeing 14 parts of a red-brown dyestuff powder are obtained. The dyestuff dyes wool from a weakly acetic bath clear yellowish red shades.

The naphthohydroquinone methylene sulfone ether aldehyde

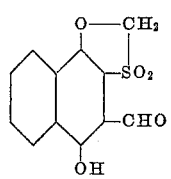

is obtained according to the Reimer-Tiemann synthesis by the action of chloroform upon naphthohydroquinone methylene sulfone ether in caustic soda alkaline solution. The aldehyde is soluble in alkalies, insoluble in water. Melting-point 251° C.

Example 11

By replacing the quantity of 4-nitro-6-chloro-2-aminophenol mentioned in Example 6 by 8.4 parts of 5-nitro-3-amino-4-cresol

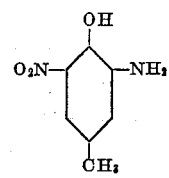

and carrying out the process as described in that example, the chrome complex of the azomethine dyestuff of the formula

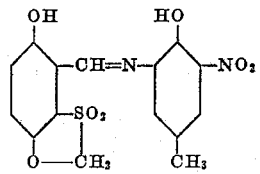

is obtained which dyes wool from neutral and weakly acetic bath in brownish orange shades. The dyestuff is distinguished by a good levelling power and a very good fastness to light.

Example 12

By replacing the quantity of 4-nitro-6-chloro-2-aminophenol mentioned in Example 6 by 8.4 parts of 5-nitro-3-amino-2-cresol

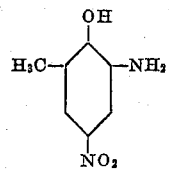

and carrying out the process as described in that example, the chrome complex of the azomethine dyestuff of the formula

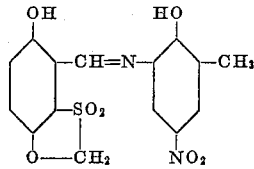

is obtained which dyes wool from neutral and weakly acetic bath red shades. The fastness to rubbing as well as to light of the dyeings is good.

We claim:

1. Chrome complex compounds of o,o'-dihydroxyazomethine dyestuffs free from sulfonic and carboxylic acid groups corresponding to the general formula

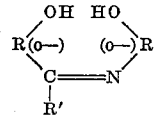

wherein the radicals R stand for aromatic radicals selected from the benzene and the naphthalene series, at least one of the radicals R containing a lower alkyl alkyl-sulfone group, and R' stands for a member selected from the group consisting of hydrogen and lower alkyl.

2. Chrome complex compounds of o,o'-dihydroxyazomethine dyestuffs free from sulfonic and carboxylic acid groups corresponding to the general formula

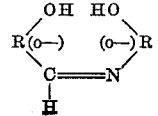

wherein the radicals R stand for aromatic radicals selected from the benzene and naphthalene series, at least one of the radicals R containing a lower alkyl alkylsulfone group.

3. Chrome complex compounds of o,o'-dihydroxyazomethine dyestuffs free from sulfonic and carboxylic acid groups corresponding to the general formula

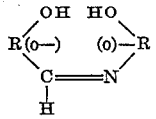

wherein the radicals R stand for aromatic radicals selected from the benzene and naphthalene series, at least one of the radicals R containing the divalent radical

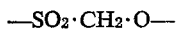

linked to two adjacent carbon atoms of the aromatic nucleus.

4. The chrome complex compound of the o,o'-dihydroxyazomethine dyestuff corresponding to the following formula

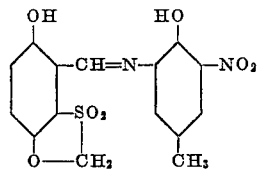

5. The chrome complex compound of the o,o'-dihydroxyazomethine dyestuff corresponding to the following formula

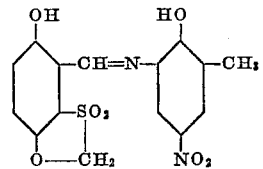

6. The chrome complex compound of the o,o'-dihydroxyazomethine dyestuff corresponding to the following formula

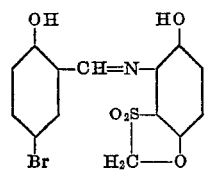

7. The chrome complex compound of the o,o-dihydroxyazomethine dyestuff corresponding to the following formula

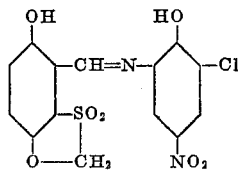

8. The chrome complex compound of the o,o'-dihydroxyazomethine dyestuff corresponding to the following formula

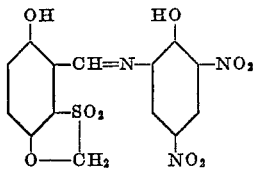

No references cited.